United States Patent
Husoy et al.

(10) Patent No.: US 8,479,097 B2
(45) Date of Patent: Jul. 2, 2013

(54) METHOD AND SYSTEM FOR GENERATING A CONTROL SYSTEM USER INTERFACE

(75) Inventors: Kristoffer Husoy, Oslo (NO); Tone-Grete Graven, Oslo (NO); Torgeir Enkerud, Oslo (NO)

(73) Assignee: ABB Research Ltd., Zürich (CH)

( * ) Notice: Subject to any disclaimer, the term of this patent is extended or adjusted under 35 U.S.C. 154(b) by 692 days.

(21) Appl. No.: 12/528,999

(22) PCT Filed: Feb. 13, 2008

(86) PCT No.: PCT/EP2008/051748
§ 371 (c)(1),
(2), (4) Date: Aug. 27, 2009

(87) PCT Pub. No.: WO2008/104459
PCT Pub. Date: Sep. 4, 2008

(65) Prior Publication Data
US 2010/0017746 A1      Jan. 21, 2010

(30) Foreign Application Priority Data

Feb. 27, 2007   (EP) .................................... 07103132

(51) Int. Cl.
*G06F 3/00*   (2006.01)

(52) U.S. Cl.
USPC ............ 715/711; 715/738; 715/771; 715/777

(58) Field of Classification Search
USPC .................................. 715/711, 771, 777, 738
See application file for complete search history.

(56) References Cited

U.S. PATENT DOCUMENTS

| | | | |
|---|---|---|---|
| 5,509,116 A | 4/1996 | Hiraga et al. | |
| 6,002,398 A | 12/1999 | Wilson | |
| 6,542,796 B1 | 4/2003 | Gibbs et al. | |
| 8,024,054 B2 * | 9/2011 | Mairs et al. | 700/83 |
| 8,245,147 B2 * | 8/2012 | Copland et al. | 715/765 |
| 2002/0046290 A1 | 4/2002 | Andersson et al. | |
| 2002/0093537 A1 * | 7/2002 | Bocioned et al. | 345/777 |

(Continued)

FOREIGN PATENT DOCUMENTS

| | | |
|---|---|---|
| EP | 660219 A2 | 6/1995 |
| EP | 1283484 A2 | 2/2003 |

(Continued)

OTHER PUBLICATIONS

PCT/ISA/210—International Search Report—Jun. 24, 2008.

(Continued)

*Primary Examiner* — Ryan Pitaro
(74) *Attorney, Agent, or Firm* — Venable LLP; Eric J. Franklin (57) ABSTRACT

A method for providing a user interface for an industrial control system including a computer and a plurality of process graphics including software objects for controlling and/or monitoring real world objects controlled by the control system. A display of selected process graphics, a designated view arranged with a tab or another selector, is automatically generated. The designated view may be generated dependent on selecting one or more logical groupings to which control system software objects representing the real world objects belong. At least one tab on a designated view, or an active link, is arranged to display a small visual representation of a second process graphic to which it is linked on detection of a computer input on or near the at least one tab, or link.

36 Claims, 7 Drawing Sheets

U.S. PATENT DOCUMENTS

| | | | |
|---|---|---|---|
| 2002/0163545 A1* | 11/2002 | Hii | 345/838 |
| 2004/0085367 A1 | 5/2004 | Hagarty, Jr. | |
| 2006/0230356 A1 | 10/2006 | Sauve et al. | |
| 2008/0027928 A1* | 1/2008 | Larson | 707/5 |
| 2008/0066004 A1* | 3/2008 | Blevins et al. | 715/771 |
| 2008/0077936 A1* | 3/2008 | Goel et al. | 719/312 |
| 2010/0031185 A1* | 2/2010 | Wilson et al. | 715/777 |
| 2010/0107115 A1* | 4/2010 | Sareen et al. | 715/783 |
| 2010/0107150 A1* | 4/2010 | Kamada et al. | 717/170 |
| 2010/0205556 A1* | 8/2010 | Madsen et al. | 715/777 |
| 2011/0113346 A1* | 5/2011 | O'Shaugnessy et al. | 715/752 |
| 2012/0079407 A1* | 3/2012 | Holmes et al. | 715/772 |
| 2012/0151308 A1* | 6/2012 | Falkenberg et al. | 715/201 |

FOREIGN PATENT DOCUMENTS

| | | |
|---|---|---|
| EP | 1376323 A1 | 1/2004 |
| WO | WO-01/02953 A1 | 1/2001 |
| WO | WO-01/15014 A2 | 3/2001 |
| WO | WO-2006/096792 A2 | 9/2006 |
| WO | WO-2006/103541 A1 | 10/2006 |

OTHER PUBLICATIONS

PCT/ISA/237—Written Opinion of the International Searching Authority—Jun. 24, 2008.

* cited by examiner

METHOD AND SYSTEM FOR GENERATING A CONTROL SYSTEM USER INTERFACE

CROSS-REFERENCE TO RELATED APPLICATIONS

This application claims priority to European patent application 07103132.2 filed 27 Feb. 2007 and is the national phase under 35 U.S.C. §371 of PCT/EP2008/051748 filed 13 Feb. 2008.

TECHNICAL FIELD

The invention concerns method and system for automatically providing a user interface in an industrial control system. In particular the invention is a user interface with improved tools for selection of process graphics and for navigation between them.

TECHNICAL BACKGROUND

In the supervisory control of industrial plants there is continual requirement for information about equipment, current and historic process data, trends, etc. This information is typically provided by the control system and usually in the form of one or more distributed control systems (DCS) and/or supervisory control and data acquisition (SCADA) systems. The information is often presented to the operators through a display screen showing a process graphic that presents process data (measurements, values), tag identifiers, equipment ID, alarm status, connections between plant equipment, etc. As more and more data is being presented to the operators, the visual user interfaces often hold a great deal of information.

The task of finding the relevant technical information in a large information space is further complicated by the fact that in many situations the operator often has limited time available to make a decision. The significance of the information available will vary with the current situation. That is, users of industrial control systems have to deal at least in part with a context sensitivity problem, as in some contexts certain information will be essential and in others irrelevant.

In U.S. Pat. No. 6,002,398 entitled Navigation between property pages with tabs and menus, assigned to Novell, Inc., a method is described for displaying a tabbed dialog box, a property sheet, which has at least one child window. The parent window or property sheet has a multiple associated, displayable child windows. However at run time the described program loads all of the objects, including graphics, for all the child windows after user initiates the action which represents a heavy load on processor, display and system resources at runtime.

Operators and other users need to navigate to the correct process graphic as quickly as possible in a control system when a critical situation has occurred. Navigating wrongly can mean seconds are lost and can potentially be the cause of damages, delays or even a plant shutdown or accident. It is of great importance in systems where the response time is low—e.g. when the load time of the graphics are high—and may occasionally be crucial, to navigate to the correct graphic immediately, not having to load several process graphics first to check whether this is the one that is needed.

WO01/02953 describes a method for integration of many and various types of applications in a computerized system. This method is based on a concept where real world objects are represented as composite. Different facets of a real world object, such as its physical location, the current stage in a process, a control function, an operator interaction etc., are described as different aspects of the composite object. In this application, composite objects as defined by WO01/02953 are referred to as aspect objects.

Finding or retrieving the right information in control systems, of finding the right graphics to carry out monitoring or control, is often difficult because the information space is so large. There are often hundreds or thousands of process graphics, and the task of navigation is often difficult or time consuming. Operators must load the process graphic to see whether it is the desired process graphic, or not, which may result in unacceptable delay while searching for the required process graphic. Although different navigation schemes have been proposed they often demand considerable additional engineering or considerable system resources, or both.

SUMMARY OF THE INVENTION

According to an aspect of the present invention an improvement is described of a method for providing a user interface for an industrial control system wherein the user interface is further arranged with a plurality of process graphics comprising one or more software objects for controlling and/or monitoring real world objects controlled by said control system, which said software objects may be arranged such that elements of one or more of the software objects or part thereof may be displayed on an interface displayed on said display device, the method comprising displaying on the interface a designated view of a first process graphic in a window arranged with one or more graphic objects preferably one or more tabs, and/or active links and by displaying on detection of a user input relative to said one or more tabs a thumbnail or small graphic representation of a second process graphic to which the tab on the first process graphic window is linked.

According to another embodiment an improved method for providing a user interface with improved navigation features for an industrial control system is described the method comprising displaying on the interface a designated view of a first process graphic in a window arranged with one or more tabs, and by providing on detection of a graphic interface computer input action or mouse pointer hover, mouse over or mouse roll over on a said one or more tabs, by a display of a thumbnail image of a process graphic related to the tab.

According to another embodiment an improved method for providing a user interface with improved navigation features for an industrial control system is described, the method comprising displaying on the interface a designated view of a first process graphic in a window arranged with one or more tabs, by displaying on detection of a predetermined computer input action or keyboard command, a thumbnail or small graphic representation of a second process graphic to which the tab on the first process graphic window is linked.

According to another embodiment an improved method for providing a user interface with improved navigation features for an industrial control system is described, the said method comprising displaying on the interface a designated view of a first process graphic in a window arranged with one or more tabs, by displaying on detection of a computer keyboard key-combination or key sequence input action relative to a said one or more tabs or active links a display comprising thumbnail representations of all of or a set of the plurality of visible tabs or links in the currently displayed process graphic. The display of several thumbnail representations of potential navigational destinations might be displayed all together, or separate displays for active links and for tabs.

According to another embodiment an improved method for providing a user interface with improved navigation features for an industrial control system is described, the said method comprising displaying on the interface a designated view of a first process graphic in a window arranged with one or more tabs by displaying, on detection of a user input to said user interface relative to a tab, a selected thumbnail or small visual representation of the process graphic of a second process graphic to which the tab is linked.

According to another embodiment an improved method for providing a user interface with improved navigation features for an industrial control system is described, the said method comprising displaying on the interface a designated view of a first process graphic in a window arranged with one or more tabs, and by further providing graphic user interface means for navigating, on detection of a user input to said user interface relative to tab, a selected thumbnail or small-scale representation of the process graphic to the process graphic to which the tab is linked.

According to another embodiment an improved method for providing a user interface with improved navigation features for an industrial control system is described, the said method comprising displaying on the interface a designated view of a first process graphic in a window arranged with one or more active links, and by further providing graphic user interface means for navigating, on detection of a user input to said user interface relative to one of the one or more links, a selected thumbnail or small representation of the process graphic to the process graphic to which the active link is linked.

According to another embodiment an improved method for providing a user interface with improved navigation features for an industrial control system is described, the method comprising displaying on the interface a designated view of a first process graphic in a window arranged with one or more tabs wherein the thumbnail or visual representation of each tab comprises a display of one or more operational elements related to the first process graphic, the display comprising any of the group of: dynamic information, information about a number of alarms, a plot or trend, a dynamic measurements, a performance indicator.

According to another embodiment an improved method for providing a user interface with improved navigation features for an industrial control system is described, the method comprising displaying on the interface a designated view of a first process graphic in a window arranged with one or more tabs and by displaying a thumbnail relative to a selected tab linked to a process graphic which thumbnail display comprises a dynamic or a static information display or a dynamic value for a number of alarms in the process graphic or in a process section related to the process graphic.

According to another embodiment an improved method for providing a user interface for an industrial control system is described, the method comprising displaying on the interface a designated view of a first process graphic in a window arranged with one or more tabs by displaying on a thumbnail of a tab linked to a process graphic any from the group of: a live image, live data, live video, a live alarm and current information such as temperature or pressure measurements.

According to another embodiment an improved method for providing a user interface for an industrial control system is described, the method comprising displaying on the interface a designated view of a first process graphic in a window arranged with one or more tabs wherein the thumbnail or representation of a tab further comprises an embedded link which is arranged, when the thumbnail is clicked or otherwise activated, to load the process graphic it is linked to.

According to an embodiment an improved method for providing a user interface for an industrial control system is described, the said method comprising displaying on the interface a designated view of a first process graphic in a window arranged with one or more tabs and displaying a window and automatically generating one or more designated views arranged with a said one or more tabs, each designated view comprising one or more tabs wherein each one or more tabs being arranged with a thumbnail or a graphic image or a small visual representation of the process graphic to which the tab is linked.

According to an embodiment an improved method for providing a user interface for an industrial control system is described, the method comprising displaying on the interface a designated view of a first process graphic in a window arranged with one or more tabs wherein each one or more graphic objects such as tabs and/or active links are arranged with a thumbnail or a graphic image or a small visual representation of the process graphic to which the tab or link is linked, wherein displaying a window and automatically generating one or more designated views arranged with a tab dependent on location of a software object in a hierarchy of object instances.

According to an embodiment an improved method for providing a user interface for an industrial control system is described, the method comprising displaying on the interface a designated view of a first process graphic in a window arranged with one or more tabs wherein each one or more tabs is arranged with a thumbnail or a graphic image or a small visual representation of the process graphic to which the tab is linked, wherein displaying a window and automatically generating one or more designated views arranged with a tab dependent on location of a software object in a hierarchy of object instances.

According to an aspect of the present invention an improvement is described of a method for providing a user interface with improved navigation features for an industrial control system wherein the user interface is further arranged with a plurality of process graphics comprising one or more software objects for controlling and/or monitoring real world objects controlled by said control system,
which said software objects may be arranged in one or more of a plurality of hierarchical functional groups or structures, the method comprising displaying on the interface a designated view of a first process graphic in a window arranged with one or more tabs, and by displaying on detection of a user input relative to said one or more tabs a thumbnail or small-scale graphic representation of a second process graphic to which the tab on the first process graphic window is linked.

According to another embodiment an improved method for providing a user interface with improved navigation features for an industrial control system is described, the method comprising displaying on the interface a designated view of a first process graphic in a window arranged with one or more tabs wherein one or more tabs are arranged with a thumbnail or a graphic image or a small visual representation of the process graphic to which the tab is linked dependent on a logical grouping of process diagrams or process graphics in which logical grouping of the first process graphic is arranged.

According to another embodiment an improved method for providing a user interface for an industrial control system is described automatically generating one or more designated views arranged with a tab, each designated view comprising one or more tabs, the method further comprising displaying a thumbnail of the process graphic to which a tab is linked on detection of a computer input mouse over signal and loading a new process graphic into the main view of a selected tab in a designated view upon a further computer input activation signal.

This invention describes using thumbnail images in relation to a designated view for navigational purposes in an industrial control system. The designated view is normally placed alongside a process graphic view, and contains objects that act as links to other process graphics. The objects in the designated view will—when clicked—lead to a new process graphic being loaded into the process graphic view. The thumbnail image appears when a graphic user interface object, in the first place a tab or a link, is "hovered" and the thumbnail image provides a preview of the process graphic that will be displayed if the respective tab is clicked. The objects in the designated view can be aligned along one or more rows, and can have a variety of graphical appearances. The objects in the designated view can be tabs, buttons, ribbons, links, or other similar objects. For clarity, tabs will henceforth be used to signify any type of objects that can be used as links to other process graphics in the designated views.

The invention provides a fast and resource-effective way to show the operators a miniature or thumbnail picture of a process graphic as a preview. An aspect of the invention has been described in an European patent application EP 07103132.2 entitled "Method and system for generating a control system user interface" assigned to ABB and filed on 27 Feb. 2007 which is hereby incorporated in full in this international patent application specification by means of this reference.

The operator can quickly assess by looking at the thumbnail or small-scale representation whether this was the process graphic that is sought, or whether this graphic contains the information sought, without having to load the whole process graphic into view. The invention comprises at least two uses of the thumbnails:
  one use is of a thumbnail that pops-up close to the mouse cursor when the mouse cursor is hovering a tab or display link
  another use is to display several thumbnails in a grid or other grouping on the monitor to present the operator with several alternatives simultaneously, for example during a ALT+TAB-interaction or similar switching type of instruction.

By displaying for the operator a thumbnail of the process graphic that will be loaded if this button/selection is clicked the operator or other user can see immediately whether this link will lead to the desired graphic and/or the desired control objects. This has the advantage of circumventing performance issues with a control system or part thereof in terms of operators not having to load several process graphics onto the display screen, each of which process graphic being slow to load or placing a heavy demand on system or workstation resources. In the case where a thumbnail also includes include dynamic information or eg static values it is easier for operator to get overview of a situation.

This invention may use the hierarchical structures of objects in an industrial control system to automatically generate and configure designated views arranged with tabs for navigating or browsing. Tabbed browsing is a method of moving from one page to another page by clicking on a tab, a method which has been used in office applications and web browsers. However, according to the invention certain designated views which are arranged with tabs may be generated by automatically reading the hierarchical object structure in the control system software and grouping objects according to their level in the structure, or tree structure, so that the tabs can be generated automatically and/or according to a logical grouping, and a thumbnail of any of those tabs then provided on selection.

Process graphics are the mainstay of most industrial control systems. All of the control objects are placed in a context of one or more process graphics. Control objects, those objects that are controlled by the control system may be referred to as real-world objects to distinguish the control objects from software objects or computer objects in an object oriented computer programme. There are different ways to group these process graphics, preferably based on a logical structure and/or functional relationship(s) between them. As an example, there can be a set of top-level graphics that act as overview graphics to the process graphics. One level down the process graphics that show the functionality for one area of this top-level are arranged. Subsequently, at a lower level than that, there are the detail graphics that show details for one or a few of the components in the process graphics.

In addition there can be other groupings, logical groupings by application or function such as maintenance routines, shutdown matrices, fire & gas graphics or other functionally separated graphics for the top-level area. These different graphics could be grouped for example such that:
  All top-level overview graphics are grouped together
  All process graphics in one top-level area are grouped together
  All detail graphics for one process graphic are grouped together
  All shutdown matrices or other functional graphics are grouped together Configuration and interaction with navigation tabs can be related to a system, a state of the system, a specific user task, different types of users and to accompany specific user preferences as recorded for example in user profile, user or needs. On a system level it is important to relate the grouping arranged with a navigation tab to an application of the system or a task that is to be preformed. In many cases a process graphic or the representation may be directly linked to a control object or a configuration setting. It is also possible to implement this as specific workplaces tailored to the application or task to be preformed. These specific workplaces use the tabs to be able to access the appropriate information for the application or task and easily switch between a plurality of appropriate displays. For example these may be operations such as start up, operate, change operation, alarm handling tasks, specific process related tasks, maintenance tasks, active or past work orders, emergency actions, shut down and so on.

In addition, the user interface may also be arranged to adapt according to user preferences, system state or current work tasks. The advantage of this mode is that it supports active exploration into the system by the operators.

According to another embodiment an improvement is provided in the form of a user interface for an industrial control system, said system being further arranged with a plurality of process graphics comprising one or more software objects for controlling and/or monitoring real world objects controlled by said control system, and computer program means for automatically generating one or more designated views each said designated view comprising one or more graphic objects, preferably as one or more tabs, and/or active links, and wherein the user interface is arranged with computer hardware and software means for displaying on detection of a computer input on or near a given tab or link in the designated view currently displayed by displaying a thumbnail image of the process graphic to which the given tab or link is linked, the destination process graphic of the given tab or link.

According to another embodiment an improvement is provided in the form of a user interface for an industrial control system, wherein the user interface is arranged with computer hardware and software means for automatically displaying, on detection of a computer input relative a tab containing a static image of the process graphic the tab is linked to, a thumbnail image comprising a dynamic information display or a dynamic value. According to another embodiment an improvement is provided in the form of a user interface for an industrial control system, wherein the user interface comprises means for automatically displaying on a tab a dynamic value for the number of active alarms for a process section.

Embodiments of the invention may advantageously be used for control purposes in a control system of an oil or gas production, storage, treatment or process installation. Embodiments of the invention may also be used for control purposes in a control system for other industrial, manufacturing or process installations, such as in the pulp & paper, oil & gas, chemistry & life sciences, and transportation industries (such as railway control systems), and also used in an installation for generation, transmission or distribution of electrical energy.

The term a real world object is used in this description to describe a control object in an industrial control system. The real world object may be an actual object such as a pump, a motor, a valve, etc., or a more abstract object such as a purchase order, production batch, etc. The present invention is not limited to traditional control or process control areas. Any real world object may be represented, as a tangible or intangible object which is controlled in a process, including a device or process in a factory, plant, oil and gas or industrial installation or a person carrying out a stage or role in a process, or intangible objects such as messages, a location, status of information etc.

In a preferred embodiment of the methods of the invention one or more methods may be carried out by a computing device comprising one or more microprocessor units or computers. The control unit(s) comprises memory means or a memory storage device for storing one or more computer programs for carrying out the improved methods. Preferably such computer program contains instructions for the processor to perform the method as mentioned above and described in more detail below.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

This invention describes a system for and a method of generating technical information comprising both static and dynamic data in industrial supervision, maintenance and control for navigation and control purposes. The trend towards operation from remote operation centres introduces an increase in both the control room operators' work domain and the workload as several different processes can be supervised and controlled in parallel.

Figure 1:
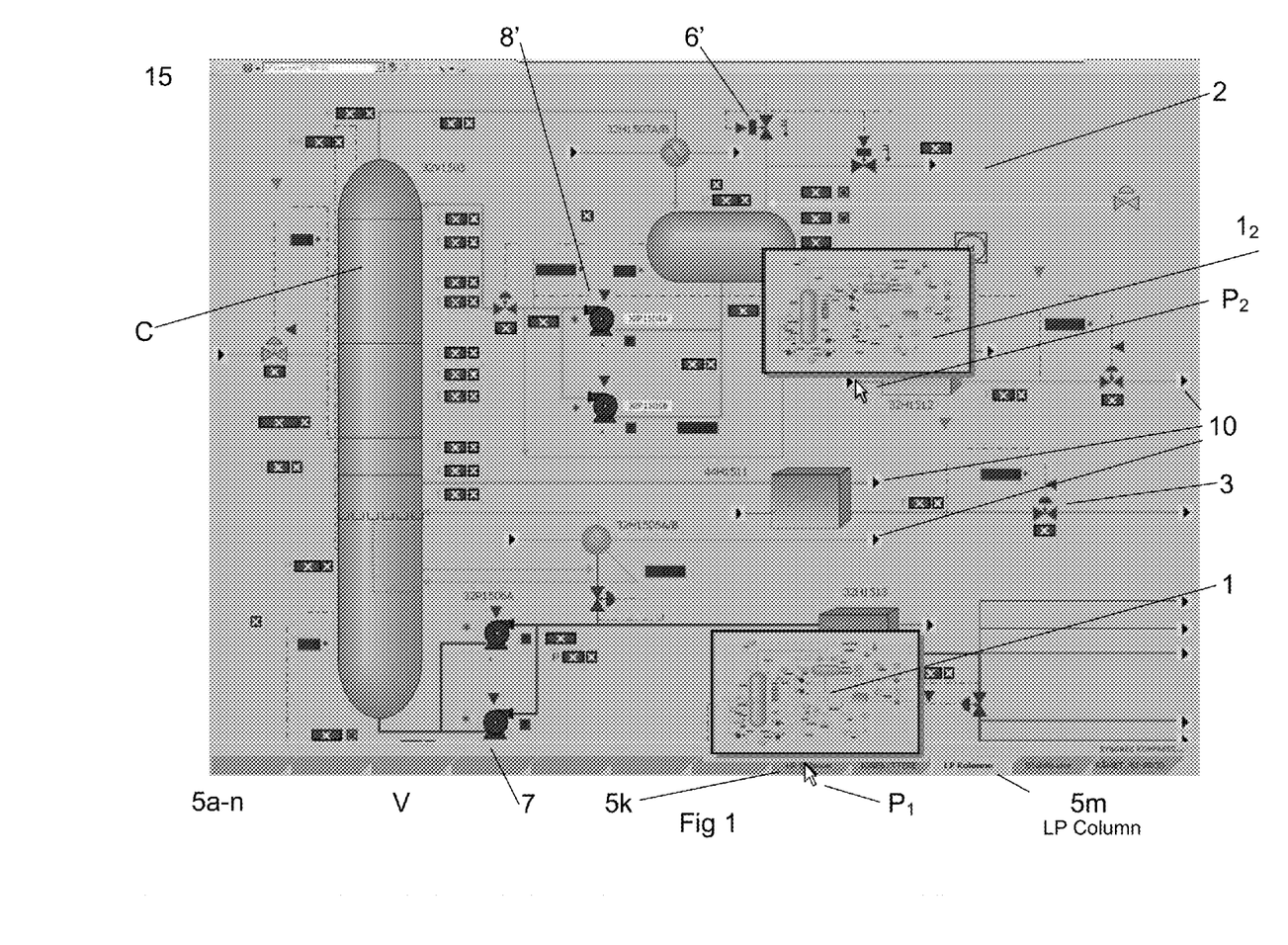
FIG. 1 is a schematic diagram for an improved user interface for an industrial control system wherein a process graphic is presented in a view arranged with one or more tabs to other process graphics arranged in a tab view arranged to display at least one thumbnail graphic of another process graphic according to an embodiment of the invention.

FIG. 1 shows a graphical user interface display 15 of an industrial control system. FIG. 1 shows a schematic of a process section, in this case for an oil and gas processing facility. The process section shown as an example comprises a process graphic 2 which contains many control objects including a HP Column C, a pump 7, a motorised valve 6', a pump 8' and a second valve 3. The process graphic 2 shown is a member of a predetermined group of process graphics, a logical grouping based on relationships to one or more technical functions in the process, and which group thus shares a common process context.

The graphical user interface display 15 has a designated view V, or a tab view, which means that the process graphic 2 is placed alongside a number of tabs 5a-n which, in this example, are placed along the bottom edge of the display area. The view currently displayed is accessible by a tab, eg tab 5m, which in this graphic is shown blank and without shading to indicate that it is currently "selected". The view displayed, process graphic 2, has then been accessed via tab 5m. Tab 5m is also marked with a process name of LP Column. In most cases, all the tabs available with a process detail view which belong to the same predetermined group of process graphics are displayed in the tab view.

FIG. 1 shows a second tab, 5k on which or near which a first computer mouse pointer $P_1$, is shown displayed. A thumbnail image 1 of a second process graphic is shown displayed. The thumbnail of the second process graphic is displayed because the mouse pointer $P_1$, has been detected as hovering or as placed on or near to one of the other tabs in the view, in this case tab 5k.

Thus the thumbnail 1 pops up unobtrusively when a tab is hovered or rolled over with the mouse pointer. When the mouse is moved away from the tab or display link, the thumbnail is automatically hidden. The user sees immediately in the thumbnail which next process graphic the tab pointed at is linked to, that is, which process graphic will be displayed if the tab is activated. Thus by means of the minimum of user actions and time, the user may see what the next process graphic would display.

The thumbnail itself may optionally also act as an embedded link arranged to cause the corresponding process graphic to be loaded when the thumbnail is clicked or another activation mechanism executed. Thus the user viewing the present process graphic 2 can quickly see a preview of another or second process graphic by placing the mouse pointer over or near the tab for another process graphic, without having to wait for a full second process graphic to load in the usual way, and then return to the first process graphic.

The thumbnail 1 graphic may be a static image of the process graphics that are stored, for example, at one time (e.g. in the engineering/configuration phase, on load or unload of process graphic). Such thumbnail graphics thus show the process graphic without any dynamic information. Such thumbnail graphics would then not give the operator any information about the current situation in the process graphic, but would serve only as a visual recognition clue as to whether the target of the link is the process graphic the user seeks.

In an alternative embodiment FIG. 1 shows how a thumbnail $1_2$ appears when a mouse is detected to be hovering over one of the active links 10. The thumbnail of the second process graphic is displayed because the mouse pointer $P_2$ has been detected as placed on or near to one of the active links 10 in the view.

Figure 2:
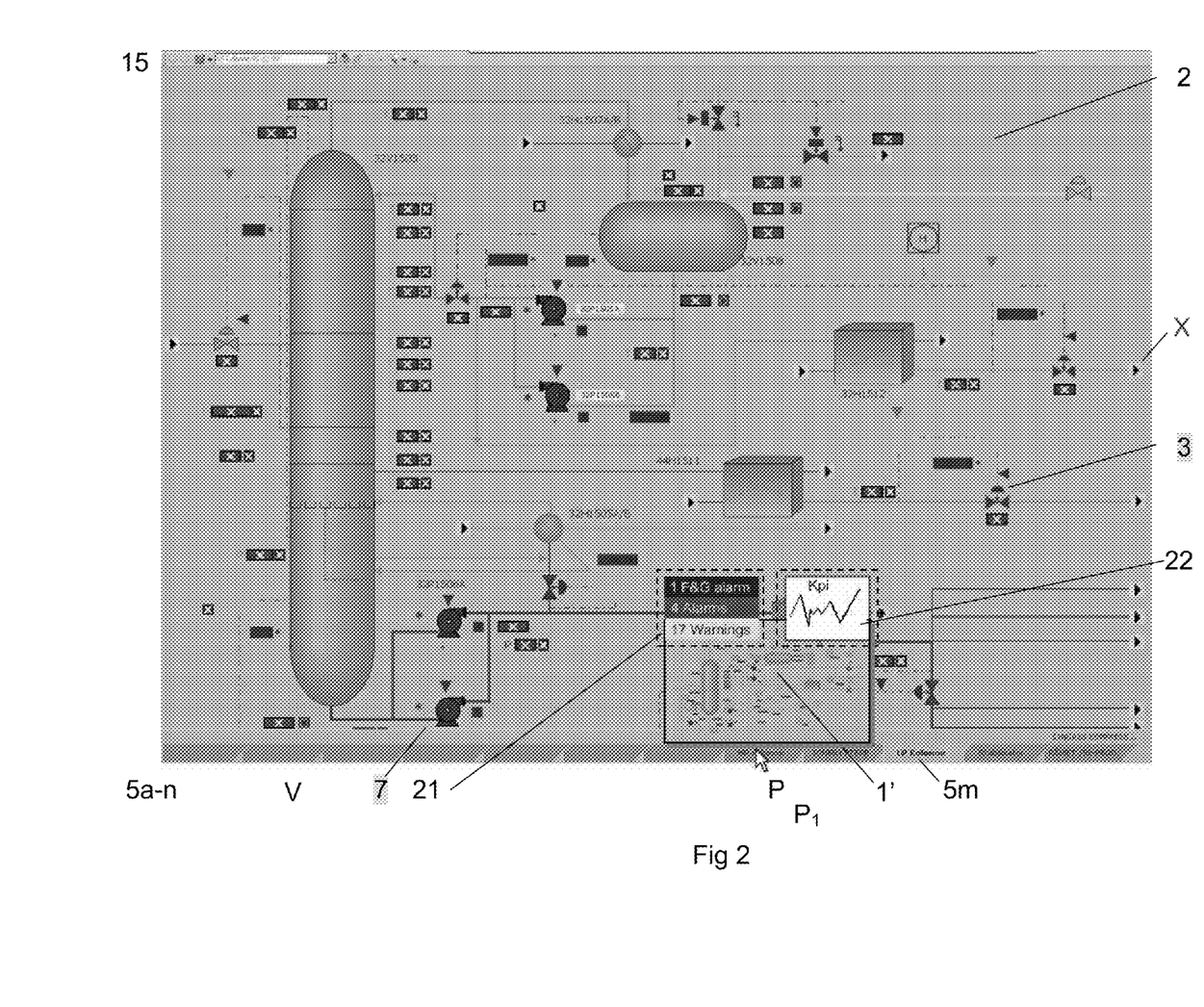
FIG. 2 is a schematic diagram for an improved user interface including one or more tabs and arrangement of a thumbnail or graphic representation arranged with an additional link or information display according to an embodiment of the invention.

FIG. 2 shows another development of the embodiment of FIG. 1 in which the thumbnails are "live", thus showing the current state of the process graphic including some content which is dynamic. FIG. 2 shows a thumbnail 1' and a display of a Fire and Gas Alarm 21*a*, live warnings 21*c*, alarms 21*b*, and key performance indicators (KPI) 22. The thumbnails 1' in this embodiment may be miniature representations of the process graphic, live process graphics, may show process values, alarm information, trends, etc dependent on the process graphic it links to.

In a development of this embodiment, the thumbnails may be generated and displayed as static thumbnails, showing the process graphic as at one time for recognition purposes, but in addition arranged with the live displays such as live alarms 21, and key performance indicators (KPI) 22 presented alongside or overlaid on the thumbnail graphic. This information may also be aggregated, alarm information eg 3 alarms in priority x; HHalarm, tagXXX, valueYYY), KPI values in numerical or miniature trend format, or other dynamic information. This information may also be retrieved from history, or other data sources available in the system, not necessarily the process graphics themselves. If dynamic information is included in the tab visualisation the dynamic information on the thumbnail can be of a more detailed nature as also described in the patent application EP 07103132.2.

Figure 3:
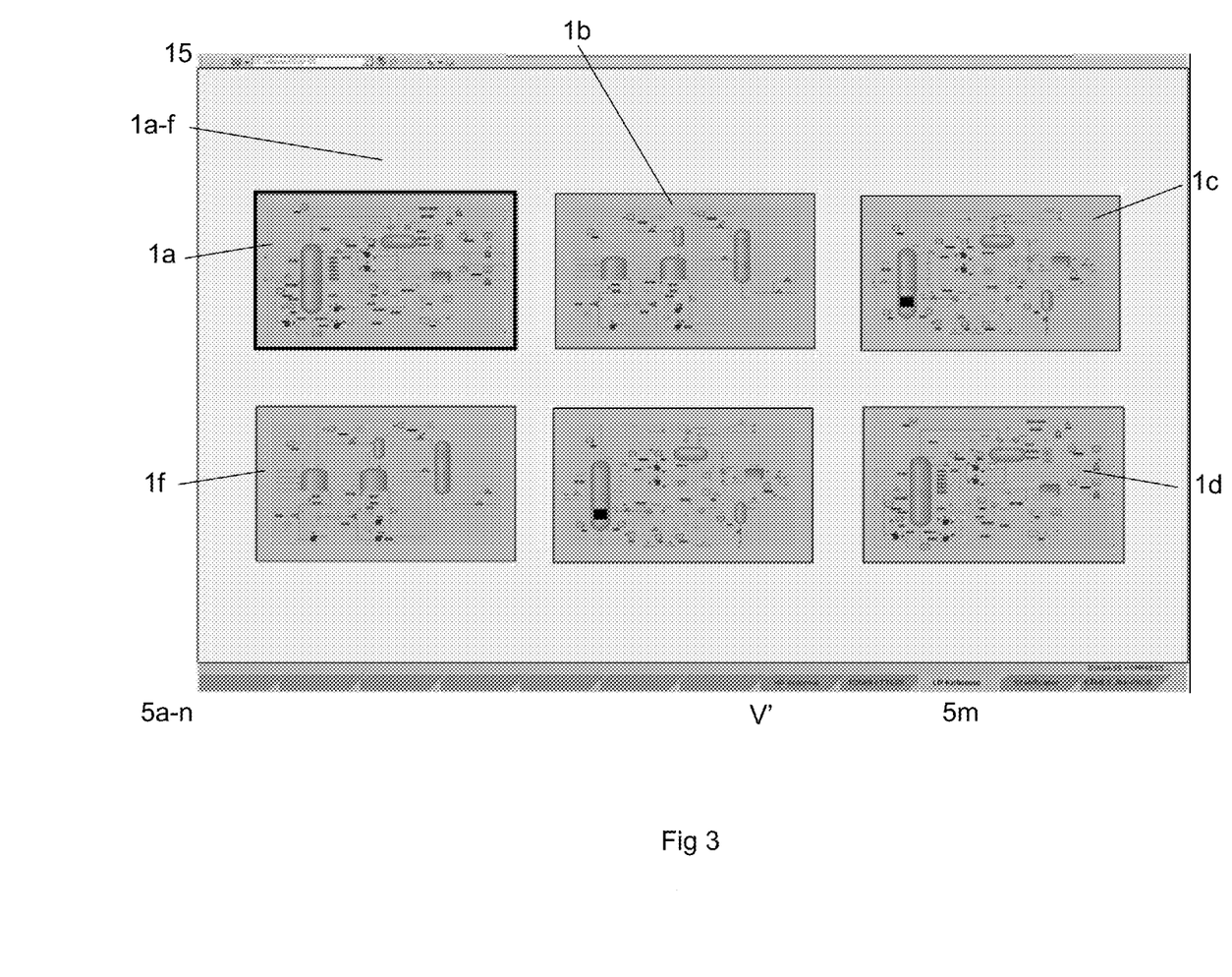
FIG. 3 is a schematic diagram for an improved user interface showing a group of thumbnails each of which displaying miniature process graphics which may be selected to navigate to the selected process graphic by selecting the thumbnail, according to another embodiment of the invention.

FIG. 3 shows a display of an example of another embodiment of the invention. In this embodiment several thumbnails 1*a*-1*f* are displayed at the same time on the display 15 to show the operator several related process graphics of possible interest at the same time. This display may comprise thumbnails of all or some of a plurality of tabs arranged on a given designated view V, V' or other tab view presented alongside a process graphic. FIG. 3 shows a display 15', a thumbnail 1*a* which is active or selected and shown highlighted in some way. Several other thumbnails 1*b*-1*f*, which are other members of the same logical group of the context-related process graphics, are shown on the same display 15'. Thumbnails 1*a*-1*f* if may then be thumbnails of all the tabs on a given tab view of a process graphic. The plurality of thumbnails linked to a given process graphic is displayed on activation or command by the user, for example through a keyboard command such as pre-configured to ALT+TAB or ALT+CTRL or similar. The plurality of thumbnails may be displayed over a processed, eg grayed-out version of the process graphic displayed at the time that the plurality of thumbnails was activated, which is the thumbnail 1*a* indicated in FIG. 3.

Thus a grid of related thumbnails are displayed when, for example, the operator initiates a tab-switch command (such as may be done by holding down ALT+pressing "TAB" or CTRL+"TAB" buttons in windows). When holding down eg ALT+Tab, the thumbnails for all process graphics that are shown in the current tab view are displayed on the screen, for example transparently overlaid on the currently visible process graphic. One of the thumbnails is always selected, and in addition by means of another command or action by, for example, continuously holding the ALT-button down and repeatedly clicking the TAB-button, the thumbnails are selected each in turn preferably sequentially. When, for example, the ALT+TAB buttons are released, the currently selected thumbnail is chosen (activated) and its corresponding process graphic, the process graphic which is linked to the tab arranged with the thumbnail, is then displayed at normal size on the workstation.

Figure 4:
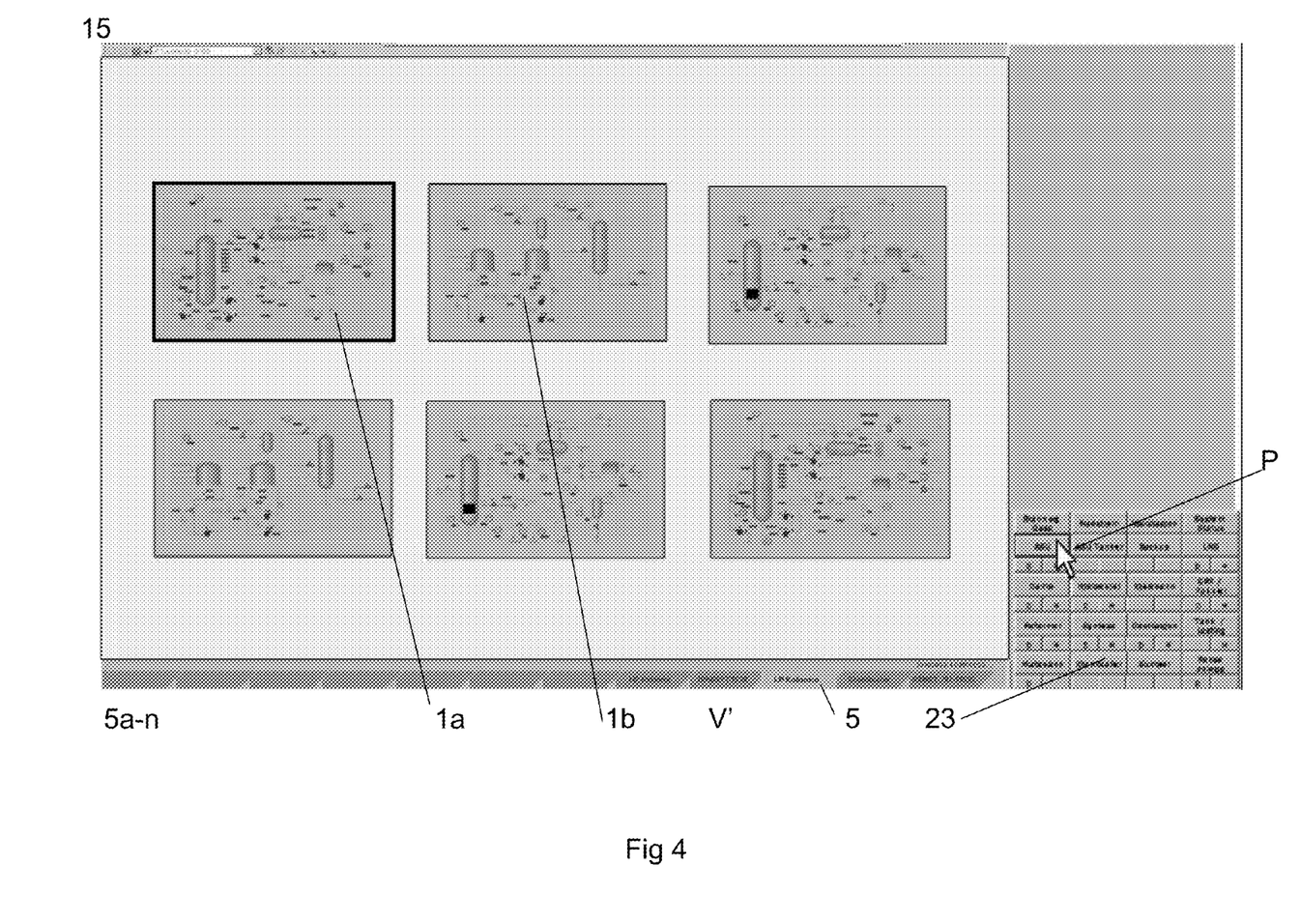
FIG. 4 is a schematic diagram for an improved user interface showing further thumbnails for process graphics and a graphic interface device, a navigation area, with a plurality of buttons, where each button is arranged to open one grid of thumbnails showing the group of related process graphics, according to an embodiment of the invention.

The above embodiment is advantageous for use with process areas that include several process graphics. FIG. 4 shows a display 15" with a plurality of thumbnails 1*a*, 1*b* arranged with a grid 23 of buttons as a selection device. For example when hovering the mouse over a process area button P in the navigation area 23 may be arranged to cause the grid of thumbnails showing all process graphics within this area to be shown. Such a navigation area may be arranged as a ribbon of buttons or thumbnails, that is, a strip or band of thumbnails or visually marked buttons arranged in one row. The buttons are links to process areas containing several process graphics, and thus to groups of related process graphics. Thus the user can navigate to a process area and call up a group of related process graphics of that area with a single graphic user interface selection by means of the button. When a button is hovered by the mouse or otherwise selected a grid of thumbnails for all process graphics in the selected area is displayed. The user can navigate to the process graphic represented by the thumbnail by clicking on it.

The user can select a process graphic by clicking on the graphic, or otherwise the default graphic is selected if the operator clicks the process area button.

In another embodiment the thumbnails are static images of the process graphic, but they are stored or updated at known intervals, and thus show a recent state of the process graphic values, trends and alarm situation.

The tabs of the designated view are linked to other process graphics according to membership of a logical or functional group.

Figure 5:
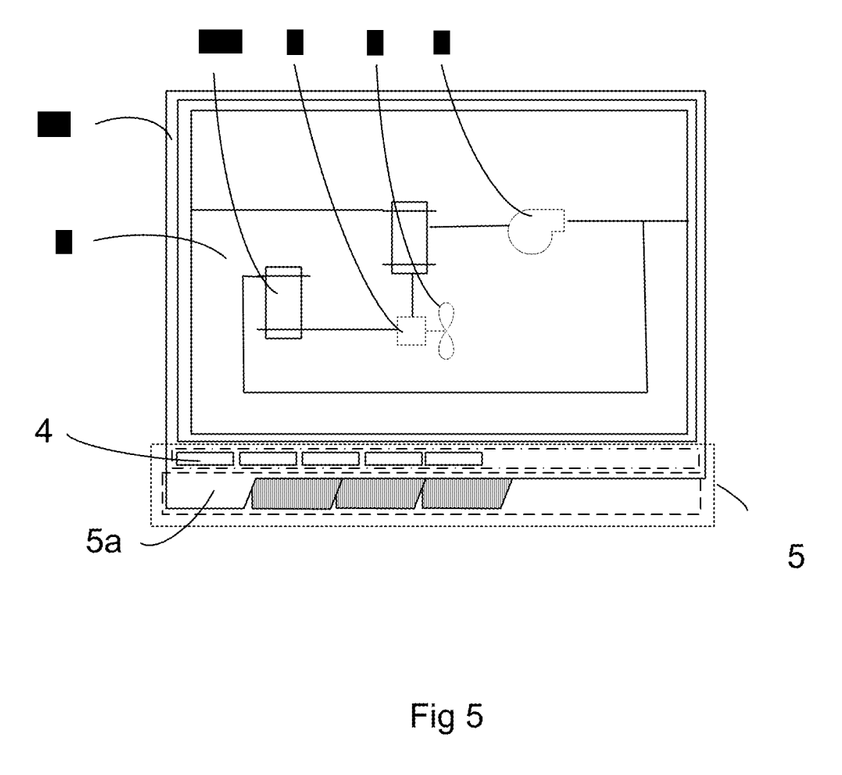
FIG. 5 is a schematic block diagram showing an arrangement of a logical or functional group of control entities being represented in a process graphic with tabs.

FIG. 5 shows in a schematic diagram a display device 15 displaying an interface 2 on a main part of a graphical display. The process graphic 2 of FIG. 5 includes a number of visual objects or icons 6, 7, 8 provided by software objects for each representing a function or aspect of a real world object, which real world object is controlled by software entities and software objects in the control system. The figure shows icons or pictures for eg a process vessel HP, an icon 7 for a pump, an icon 6 for a stirrer and an icon 8 for a stirrer motor in this view of a process. This view was displayed by selecting by the tab 5*a*, which as shown in FIGS. 1 and 2 may also be indicated as HP Column. Referring briefly to FIGS. 1 and 2, we can say that the tab name "HP Column" may be an Object name for this process graphic, and is read by the Object name aspect object from a software object it is associated with in a structure within a control system computer program.

On a secondary part of the graphical display a tab view 5 is shown including four tabs, of which one 5*a* is blank to indicate that it is currently selected, and three tabs shown with a pattern (grayed) to indicate not-selected or inactive. In addition, a second row of tabs, subtabs 4 are shown on the display.

The subtabs provide access to process graphics present in the control system which are logically related the selected tab. Relation may be applied by means of a hierarchical structure of software objects in a control system program. For example a selected tab may represent a given process graphic from a higher level in the structure. Thus selecting tab 5 of FIG. 5 results in loading and displaying the corresponding process graphic in the view V, and the loading and displaying as well of the subtabs 4 in the view V.

A software object representing a real world object controlled by the control system can be placed in several different structures within the control system software at the same time, where the different structures represent different relations, e.g. such as functional and physical containment. Thus relations may be such as a functional structure of eg an electrical system, a process section, a piping layout; and a location structure may be a building location, area location, room location, which storey or level, and so on. One result of this is that the same pump or filter may be represented by more than one software object, represented in a process diagram, a location in a plant by building, floor, and area etc as well as in an electrical diagram, a detail process diagram, a process piping diagram and so on, which may be in a similar way as the structures described in WO01/02953 or US-2002-0046290-A1, of which the latter is hereby incorporated in this specification in its entirety by means of this reference.

Tab configuration, and thus the thumbnails arranged with them, can be configured or engineered to relate to working tasks, system status, information types and user preferences. There are at least two basic ways to relate presentation objects in a tabbed view. The tab view can either be predefined to include a set of objects or configured based on properties of the presentation objects. These two approaches are not exclusive and a single object can relate to both predefined tabs and to a local tab for a group of presentation objects used in a single presentation. Predefined tabs may relate to work tasks, system states, user preferences or information types. Local tabs may for example relate to system states, user preferences and information types.

The grouping of these information objects can be done according to many different criteria. Examples might be to group objects according to presentation mode (e.g. textual, graphical, auditory, visual), data type (current/historic, analog/digital), functional aspects (electrical, process, cooling system, fire & gas, etc) or other logical relationships. In performing different tasks and in the supervision of different process states, the operator will have different requirements for information. That means that the information presented needs to be context sensitive. An example of a state of a process that creates specific information needs and increased workload for the operator is start-up and shutdown of the plant.

As another example maintenance personnel need specific information in order to plan maintenance, such as run-time measurements, vibration measurements, maintenance alerts/alarms, active or past work orders connected to the equipment etc. Specific tabs and thumbnails pre-configured for retrieval and display of maintenance information can be made available to maintenance personnel, allowing him or her to work in the same system as the control room operators but with different information presented or the same type of information presented but grouped in different ways depending on a maintenance etc function or task.

The invention relates to systems that are used by operators in control rooms today, but may also be very relevant for new types of control room interfaces. Current control room interfaces are normally based on desktop computers with one or more desktop monitors and/or one or more large screens. The methods may be used in such a setting, but it may also be used for mobile interaction devices such as tablet-pc's, mobile phones, electronic paper, virtual or augmented reality systems, PDAs, multi-modal interfaces, etc.

The method can be used on any system for process information visualization that is used to present groups of information that can be of varying relevance to the operator depending on the current context. The process visualization system can for example be P&ID based graphics, abstraction hierarchies, model-based representations, 3D visualizations or abstract visualizations of process information. A description of a 3D representation of an industrial process arranged in conjunction with a control system is described in application U.S. 60/6677,080, which specification is hereby included in its entirety by means of this reference.

Figure 6:
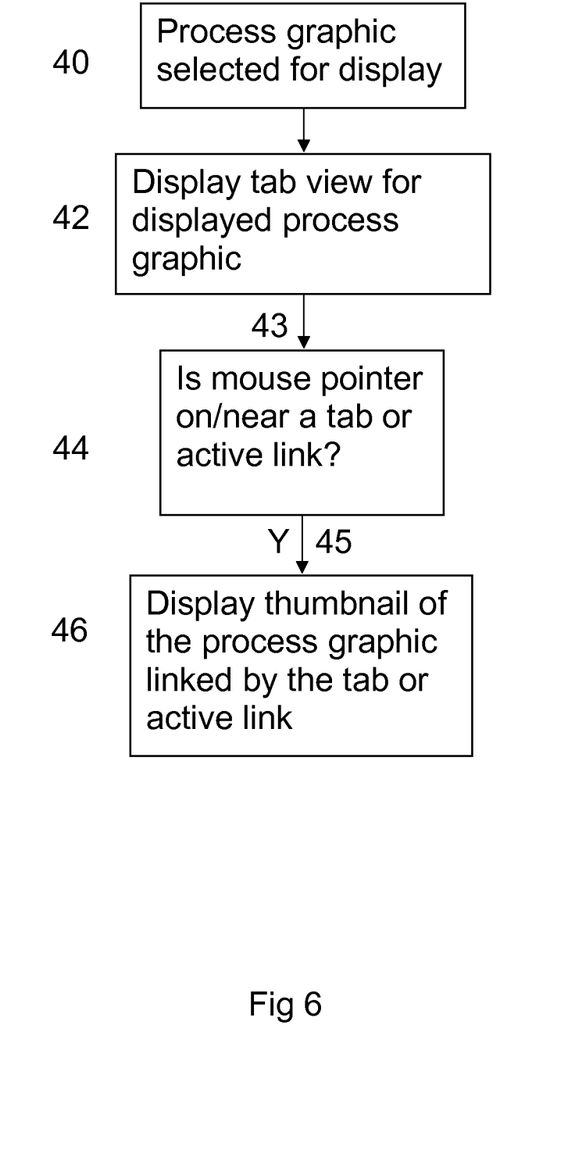
FIG. 6 is a flowchart for a method to display a thumbnail process graphic on a user interface for an industrial control system by a mouse over or roll over indication on the interface, according to an embodiment of the invention.

FIG. 6 shows a flowchart for a method for navigating in a complex system, to access a desired view of eg a particular process graphic, namely by using the thumbnail feature of one or more tabs, such as tab 5a in FIGS. 1, 2 and 5:

40. User or interface selects a process graphic;
42. Interface displays tabs to the detected other tab views linked and or grouped with the selected process graphic
44. Interface or other application in control system detects if the mouse pointer is on or near a given tab or link
45. If yes, then 46
46. The thumbnail representation of the process graphic to which the given tab or link is linked is displayed.

Fast and accurate navigation by tabs between different process graphics, to or from different process displays, and to or from different detail displays is thus provided by the thumbnail pictures available on request for each tab. In addition, the visual objects or graphic elements or other objects that make up the desired process graphic displayed by selecting a "new" tab may, if so desired or pre-configured, only be loaded on actual activation of the tab so that so that the system resources consumed by these methods prior to arriving at the desired display are minimal.

Figure 7:
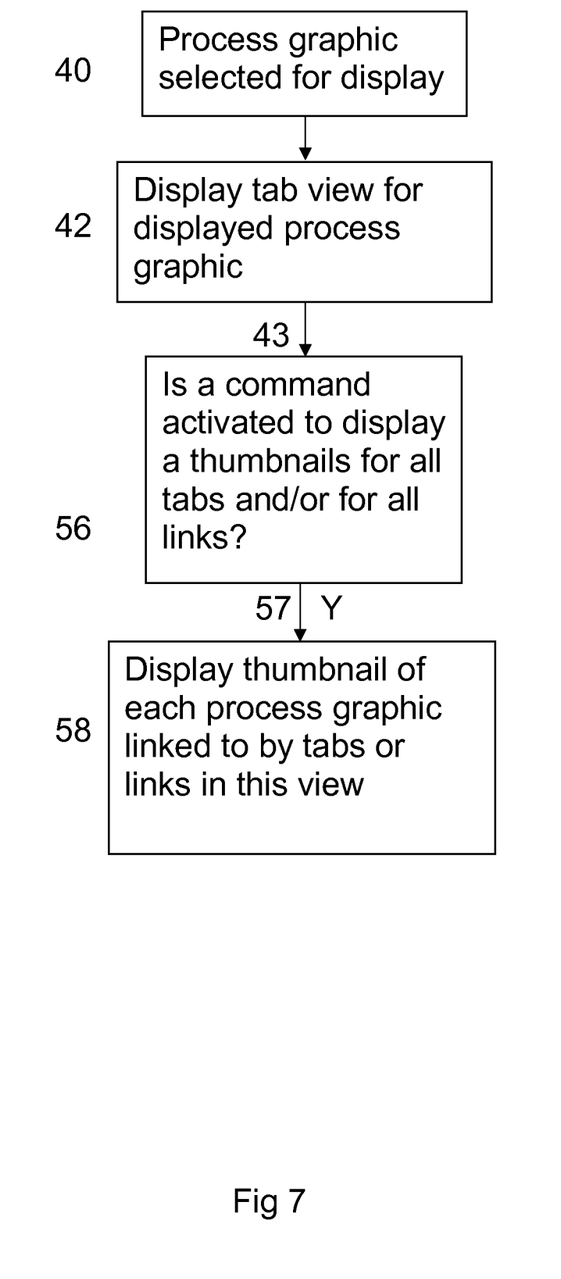
FIG. 7 is a flowchart for a method to display a plurality of thumbnails for a group of related process graphics in tab views on a user interface for an industrial control system by a user input or command, according to another embodiment of the invention.

FIG. 7 shows a flowchart for a method that for providing more than one thumbnail representation in a display for tab views of process graphics that have a plurality of tabs. The method comprises the steps of:

40. User or interface selects a process graphic;
42. Interface displays tabs to the detected other tab views linked and or grouped with the selected process graphic
56. Is a command activated or input detected to display a thumbnail of each tab or link in the tab view
57. If yes then 58
58. Display the thumbnail representation of the presently selected process graphic as well as the thumbnail of each process graphic which is linked by a tab or active link on the process graphic currently displayed.

Once again fast and accurate navigation by tabs between different process graphics, to or from different process displays, is enabled by the thumbnail pictures available for each tab.

In another embodiment, a tab of a designated view may be arranged to display a reduced scale or thumbnail picture of the process graphic that the tab, on selection, leads to. This gives the user a preview or a guide, activated for example on mouse roll over, that is to say, by the user positioning a cursor or mouse pointer over the tab. The thumbnail may be a small static image, for example a bitmap, showing the process graphic that the tab leads to. The thumbnail may alternatively be a reduced scale version of the actual process graphic from the destination, when system resources permit. Otherwise, because of issues such as the use of resources, time lag for updating and so on, the thumbnail may be a library element, or a library element updated only at restricted intervals, such as for example updated each time that the designated view is closed.

Alternatively, the thumbnail image may be live but updated on a low priority basis, for example within 10 seconds. When a thumbnail or a static thumbnail is used, additional information may be added to the image. For example one or more simple indicators, representing a blinking lamp or similar, may be superimposed on the process graphic to show an alarm, or alarm still open, or a particular class of event.

In a development, the small images or thumbnail pictures may be arranged to appear on command relative to a designated tab view, and a keyboard command such as "Alt+Tab" or other command used to switch between tabs arranged in designated views.

In an international application WO2006103541 A1 entitled Method and system for providing a user interface, hereby incorporated in full in this specification by means of this reference, it is described that information is presented at least in part displayed in layers or filters on one or more display screens of a control system; and that the content for the layers, which also provide an interface to a process state or function, is determined based on information available from said control system, dependent on which of the available items of said information shall be visually displayed or otherwise presented prominently, or displayed less prominently, or hidden.

In a development of a further embodiment of the present invention the feature of displaying process information distributed between layers is combined with the feature of designated views arranged with a tab which tab is further arranged with a thumbnail representation. Thus for example during a particular operation, for example an optimization task, the layer function may used to select that a layer of the process graphic shall be visible or not visible. Thus a layer comprising a process flow function or a process control function or a location schema may on selection be switched display visible or not visible by means of layers. This may be arranged for different functions, configuration, maintenance, optimization or for different operations, for example start up, trouble shooting, change of operation state and so on.

Methods of the invention may be supervised, controlled or carried out by one or more computer programs. One or more microprocessors (or processors or computers) comprise a central processing unit CPU connected to or comprised in one or more of the above described crane control units, which processors, PLCs or computers perform the steps of the methods according to one or more aspects of the invention, as described for example for operating or controlling a system of two industrial handlers and two presses, as described with reference to FIGS. 6-7. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowcharts of FIGS. 6-7, and/or to the graphic user interfaces of FIGS. 1-4. A part of the program may be stored in a processor as above, but also in a ROM, RAM, PROM, EPROM or EEPROM chip or similar memory means. The or some of the programs in part or in whole may also be stored locally (or centrally) on, or in, a memory storage device of a control system, and/or on suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A method for providing a user interface with improved navigation features for an industrial control system comprising a computer and a display device said system further comprising software objects for controlling and/or monitoring real world objects controlled by said control system, said system further comprising a plurality of process graphics comprising at least one of said software objects, the method comprising:
   displaying on said user interface a designated view of a first said process graphic in a window comprising at least one graphic user interface object comprising a link for navigating to at least one process graphic; and
   displaying, on detection of a user input to said user interface relative to one of said at least one graphic user interface object, a thumbnail picture or small-scale representation of a second process graphic to which the tab or link on the window containing the first process graphic is linked,
   wherein the user interface comprises computer program instructions for automatically displaying at least one selected tab arranged for displaying a thumbnail of the destination process graphic of a selected tab, dependent on a task for an operator, the task comprising any from the group of: start up, operate, change operation, alarm handling tasks, specific process related tasks, maintenance, shut down.

2. The method according to claim 1, further comprising:
   providing a thumbnail or small representation of a second process graphic on detection of a user input to said user interface relative to a tab arranged on the designated view.

3. The method according to claim 1, further comprising:
   providing a thumbnail or small representation of a second process graphic on detection of a user input to said user interface relative to a link arranged on the designated view.

4. The method according to claim 1, further comprising:
   providing on detection of a graphic interface computer input action or mouse pointer hover, mouse over or mouse roll over on a said one or more tabs, a display of the thumbnail picture or small-scale representation of a process graphic related to the tab.

5. The method according to claim 1, further comprising:
   providing on detection of a graphic interface computer input action or mouse pointer hover, mouse over or mouse roll over on a said one or more links, a display of the thumbnail picture or small-scale representation of a process graphic related to the tab.

6. The method according to claim 1, further comprising:
   displaying on detection of a predetermined computer input action or keyboard command, a thumbnail image of a plurality of process graphics related to the tabs.

7. The method according to claim 6, further comprising:
providing, on detection of a computer keyboard key-combination or key sequence input action relative to a said one or more tabs, a display comprising thumbnail representations of a plurality of visible tabs in the currently displayed process graphic.

8. The method according to claim 1, further comprising:
providing, on detection of a user input or activation command to said user interface relative to a selected thumbnail or small-scale representation of the process graphic, a display of the process graphic to which the tab is linked.

9. The method according to claim 1, further comprising:
navigating, on detection of a user input to said user interface relative to a selected thumbnail or small-scale representation of the process graphic, to the process graphic to which the tab is linked and displaying the process graphic.

10. The method according to claim 1, wherein the thumbnail or small-scale representation of a tab comprises a display of one or more operational elements of a real world object being any of the group of: dynamic information, information about a number of alarms, a plot or trend, a dynamic measurements, a performance indicator.

11. The method according to claim 10, further comprising:
displaying a thumbnail or small-scale representation of a process graphic which comprises a dynamic information display or a dynamic value for a number of alarms in the process graphic or a process section related to the process graphic.

12. The method according to claim 10, further comprising:
displaying a thumbnail or small-scale representation of a tab linked to a process graphic which comprises a static information display or a static value for a number of active alarms in the process graphic related to.

13. The method according to claim 1, further comprising:
displaying on a thumbnail or small-scale representation of a process graphic any from the group of: a live image, live video, live alarm, and live data.

14. The method according to claim 1, wherein the thumbnail or small-scale representation comprises an embedded link arranged to cause the process graphic it is linked to load when the thumbnail is clicked or otherwise activated.

15. The method according to claim 1, further comprising:
displaying a window and automatically generating one or more designated views arranged with a tab, each designated view comprising one or more tabs and comprising any of said process graphics, each one or more tabs being arranged with a thumbnail or small-scale representation of the process graphic to which the tab is linked.

16. The method according to claim 15, further comprising:
displaying a window and automatically generating one or more designated views arranged with a tab dependent on location of a software object in a said hierarchy of object instances or a said structure.

17. The method according to claim 1, further comprising:
selecting the one or more said software objects dependent on a logical grouping of operational elements and a process diagram in which logical grouping of said software object is arranged.

18. The method according to claim 1, further comprising:
automatically generating a tab view, the contents of which are dependent on at which position in a hierarchical structure below a said software object the process graphic is arranged.

19. The method according to claim 18, further comprising:
selecting the one or more said software objects dependent on a logical grouping in which said software object is arranged and at which level in a hierarchy the logical grouping is arranged.

20. The method according to claim 1, further comprising:
updating the static or dynamic visual objects displayed in a thumbnail of a designated view with tabs, and
updating the said designated view with all new objects found the corresponding hierarchical or logical group.

21. The method according to claim 1, further comprising:
receiving in the control system a manual request to update the objects in a designated view, and
updating the said designated view with all new objects found the corresponding hierarchical logical group.

22. The method according to claim 1, further comprising:
generating in the control system a prompt to an operator or other user suggesting that a manual request to update one or more of the links or objects in a designated view should be made.

23. The method according to claim 1, further comprising:
maintaining a thumbnail of a given designated view arranged related to a tab visible at all times on an operator display.

24. A computer program product, comprising:
a non-transitory computer readable medium; and
computer program instructions recorded on the computer readable medium and executable by a processor for providing a user interface for an industrial control system comprising a computer and a plurality of process graphics comprising software objects for controlling and/or monitoring real world objects controlled by said control system, said program contains software code portions to make a computer or processor carry out a method comprising
displaying on said user interface a designated view of a first said process graphic in a window comprising at least one graphic user interface object comprising a link for navigating to at least one process graphic; and
displaying, on detection of a user input to said user interface relative to one of said at least one graphic user interface object, a thumbnail picture or small-scale representation of a second process graphic to which the tab or link on the window containing the first process graphic is linked,
wherein the user interface comprises computer program instructions for automatically displaying at least one selected tab arranged for displaying a thumbnail of the destination process graphic of a selected tab, dependent on a task for an operator, the task comprising any from the group of: start up, operate, change operation, alarm handling tasks, specific process related tasks, maintenance, shut down.

25. A user interface for an industrial control system with improved navigation features, the system comprising a computer and a display device said system further comprising a plurality of process graphics comprising software objects for controlling and/or monitoring real world objects controlled by said control system, said system further comprising a plurality of process graphics comprising at least one of said software objects, arranged such that visible graphic user interface elements of at least one of the software objects may be displayed on an interface displayed on said display device, said user interface comprising:
a non-transitory computer readable medium;
a computer program recorded on said medium;

said computer program comprising:
  computer program instructions for automatically generating on the interface a designated view of a first process graphic in a window arranged with at least one graphic user interface object,
  computer program instructions for automatically displaying at least one selected tab arranged for displaying a thumbnail of the destination process graphic of a selected tab, dependent on a task for an operator, the task comprising any from the group of: start up, operate, change operation, alarm handling tasks, specific process related tasks, maintenance, shut down,
  a computer input element arranged for a user to provide input to said user interface relative to said at least one graphic user interface object, and
  a display configured to display a thumbnail or small-scale representation of a second process graphic to which the tab on the first process graphic window is linked.

26. An industrial control system with improved navigation features, comprising:
  a computer,
  a user interface and
  a display device said control system further including a plurality of process graphics comprising one or more software objects for controlling and/or monitoring real world objects controlled by said control system, which said software objects arranged such that visible graphic user interface elements of one or more of the software objects may be displayed on an interface displayed on said display device,
  wherein the user interface of the control system comprises
  computer program instructions for automatically generating on the interface a designated view of a first process graphic in a window arranged with at least one graphic user interface object,
  computer program instructions for automatically displaying at least one selected tab arranged for displaying a thumbnail of the destination process graphic of a selected tab, dependent on a task for an operator, the task comprising any from the group of: start up, operate, change operation, alarm handling tasks, specific process related tasks, maintenance, shut down,
  a computer input element arranged for a user to provide input to said user interface relative to said at least one graphic user interface object, and
  a display configured to display a thumbnail or small-scale representation of a second process graphic to which the tab on the first process graphic window is linked.

27. The industrial control system according to claim 26, further comprising:
  a computer input element arranged to detect of a graphic interface computer input action of a mouse pointer hover, mouse over or mouse roll over on or near a said one or more graphic user interface objects comprised as a tab or a link.

28. The industrial control system according to claim 26, further comprising:
  a computer input element arranged to detect of a computer keyboard key-combination or key sequence input action relative to said one or more tabs or links, and a display generator configured to generate a display comprising thumbnail representations of a plurality of visible tabs in the currently displayed process graphic.

29. The industrial control system according to claim 26, further comprising:
  a display configured to display a thumbnail of a tab or link linked to a process graphic which thumbnail comprises a dynamic information display or a dynamic value for a number of alarms in the process graphic or a process section related to the process graphic.

30. The industrial control system according to claim 26, further comprising:
  a link embedded in a thumbnail or visual representation of at least one tab or link and arranged with interface input detector to cause the process graphic with which it is linked to be loaded when the thumbnail is clicked or otherwise activated.

31. The industrial control system according to claim 26, further comprising:
  computer program instructions and a data network according to an OPC or similar protocol for updating or refreshing the data links said designated view.

32. The industrial control system according to claim 26, further comprising:
  computer program instructions and a data network for receiving in the control system a manual request to update the data links or objects in a designated view, and updating the said designated view with all new data and/or new objects found in the corresponding thumbnail of the process graphic.

33. The industrial control system according to claim 26, wherein the user interface comprises an updater configured to automatically update said tab view with all new objects found in a hierarchical group, logical group or structure upon receipt of a configuration request to update the objects in a tab view.

34. The industrial control system according to claim 26, wherein the user interface comprises computer program instructions for automatically displaying a thumbnail one or more tabs on a designated view which is displayed dependent on a status of a process controlled by said control system, the status predetermined to comprise any from the group of: a start or start-up, an operate, a process change, an event, an alarm, a stop, an offline, a configuration or maintenance status, a simulation.

35. The industrial control system according to claim 26, wherein said one or more software objects for controlling and/or monitoring real world objects controlled by said control system, are arranged in one or more of a plurality of hierarchical functional groups or structure.

36. A method for navigating in an industrial control system comprising a computer, and a plurality of process graphics, said control system comprising at least one software object for controlling and/or monitoring real world objects controlled by said control system, which said software objects which are arranged in a hierarchical way in at least one of a plurality of functional groups or structures, in which at least one of the software objects may be displayed on an interface displayed on a display device, wherein said interface
  automatically provides on a graphic user interface a designated view of a first process graphic comprising one or more of said software objects in a window arranged with at least one tab and/or link,
  automatically displays at least one selected tab arranged for displaying a thumbnail of the destination process graphic of a selected tab, dependent on a task for an operator, the task comprising any from the group of: start up, operate, change operation, alarm handling tasks, specific process related tasks, maintenance, shut down,
  by displaying, on detection of a user input to the graphic user interface relative to one of said at least one tab and/or link, a thumbnail or small-scale representation of a second process graphic that may be navigated to by selecting the one of said at least one tab and/or link on the first process graphic of the interface, and
  includes a computer input element arranged for a user to provide input to said user interface relative to said at least one graphic user interface object.

* * * * *